(12) United States Patent
Moosmann et al.

(10) Patent No.: US 8,701,707 B2
(45) Date of Patent: Apr. 22, 2014

(54) PRESSURE CONTROL VALVE DEVICE

(75) Inventors: Markus Moosmann, Gruenkraut (DE); Frank Hamma, Oberteuringen (DE); Karlheinz Mayr, Bregenz (AT); Hubert Remmlinger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 604 days.

(21) Appl. No.: 12/811,951

(22) PCT Filed: Dec. 8, 2008

(86) PCT No.: PCT/EP2008/066983
§ 371 (c)(1),
(2), (4) Date: Jul. 7, 2010

(87) PCT Pub. No.: WO2009/092488
PCT Pub. Date: Jul. 30, 2009

(65) Prior Publication Data
US 2010/0276022 A1    Nov. 4, 2010

(30) Foreign Application Priority Data

Jan. 21, 2008   (DE) .................. 10 2008 000 106

(51) Int. Cl.
*F16K 31/06* (2006.01)

(52) U.S. Cl.
USPC ............... 137/596.17; 251/129.14; 251/126; 137/625.65

(58) Field of Classification Search
USPC ............ 137/596.17, 601.01, 601.14, 601.18, 137/625.26, 625.28, 625.65, 808, 809, 811, 137/813, 862, 864; 251/118, 119, 126, 251/129.14, 129.15; 239/590.3, 599; 303/119.2

See application file for complete search history.

(56) References Cited

U.S. PATENT DOCUMENTS

| | | | | |
|---|---|---|---|---|
| 2,936,780 A | * | 5/1960 | Pratt | .............................. 137/560 |
| 4,474,332 A | * | 10/1984 | Kaska | ......................... 239/585.3 |
| 4,936,342 A | | 6/1990 | Kojima et al. | |
| 5,076,323 A | * | 12/1991 | Schudt | ..................... 137/596.17 |
| 5,104,091 A | | 4/1992 | Rathay et al. | |
| 6,343,672 B1 | | 2/2002 | Petela et al. | |

(Continued)

FOREIGN PATENT DOCUMENTS

| | | |
|---|---|---|
| DE | 39 02 466 A1 | 8/1989 |
| DE | 10 2004 059 119 A1 | 2/2006 |
| WO | 02/06911 A2 | 1/2002 |
| WO | 2005/026858 A1 | 3/2005 |

*Primary Examiner* — John Rivell
*Assistant Examiner* — Matthew W Jellett
(74) *Attorney, Agent, or Firm* — Davis & Bujold, PLLC; Michael J. Bujold (57) ABSTRACT

A pressure control valve device with at least one inlet area and first and second outlet areas which can be connected by two poppet valves. A flow guide device (21), with inflow and outflow areas (22, 23) for guiding the fluid flowing from the inlet area in a defined manner in the direction of the second poppet valve, is located upstream of the second poppet valve, between the first and second outlet areas. The fluid in the flow guide device (21) passes in the area between the inflow and outflow areas (22, 23) through a plurality of channel areas distributed around the periphery of the flow guide device (21) and separated from one another, which are shaped at least approximately helically and impart an at least approximately vortex-like flow pattern to the fluid flowing in the direction of the second poppet valve downstream of the outflow area (23).

19 Claims, 7 Drawing Sheets

(56) References Cited

U.S. PATENT DOCUMENTS

| | | |
|---|---|---|
| 6,719,006 B2 * | 4/2004 | Fleischer et al. ......... 137/596.17 |
| 6,904,934 B2 | 6/2005 | Runge et al. |
| 7,370,669 B2 | 5/2008 | Urya et al. |
| 7,516,756 B2 | 4/2009 | Mayr et al. |
| 2004/0021103 A1 * | 2/2004 | Yang et al. ................. 251/30.03 |
| 2005/0067028 A1 | 3/2005 | Ryuen et al. |
| 2006/0086393 A1 * | 4/2006 | Bailey ...................... 137/601.18 |
| 2007/0138422 A1 * | 6/2007 | Najmolhoda et al. ... 251/129.14 |
| 2009/0065722 A1 * | 3/2009 | Schmidt et al. .......... 251/129.14 |
| 2012/0298898 A1 * | 11/2012 | Scherer et al. ........... 251/129.15 |

* cited by examiner

PRESSURE CONTROL VALVE DEVICE

This application is a National Stage completion of PCT/EP2008/066983 filed Dec. 8, 2008, which claims priority from German patent application serial no. 10 2008 000 106.6 filed Jan. 21, 2008.

FIELD OF THE INVENTION

The invention concerns a pressure control valve.

BACKGROUND OF THE INVENTION

In motor vehicle automatic transmissions known from practice, shifting elements in the form of wet-operating disk clutches or disk brakes are used to transfer torque between a transmission input and a transmission output. In this context, force is transferred by frictional means, by the compression of disk sets of the shifting elements. The pressing force required in each case for this compression of the disk sets is usually produced by hydraulically actuated clutch pistons, which are actuated by means of pressure control valves and clutch valves. Such clutch valves, also known as pressure-reduction valves, are appropriately actuated either directly by a proportional magnet, or by further pressure-limiting valves by means of which a pilot control pressure is adjusted as a function of a control current.

In both methods for actuating the pressure control valves, in each case a magnetic force proportional to the control current is produced, depending on which the hydraulic pressure-reduction valves or clutch valves are actuated. The working pressures of the clutch valves are determined in each case by the equilibrium condition between the control-current-proportional magnetic force or actuating force and the return or reaction force of a clutch valve.

Particularly, pressure control valves actuated by pilot pressures are often made with two poppet valves arranged in a hydraulic semi-bridge circuit, and are known as so-termed closed-end pressure regulators. In their end positions such closed-end pressure regulators are characterized by low leakage since the valve seats of the poppet valves are closed in alternation in the end positions. Thus, despite the large number of shifting elements in an automatic transmission that have to be controlled hydraulically, the hydraulic fluid volume required by a hydraulic system of a motor vehicle automatic transmission can be restricted to a minimum and a hydraulic pump of correspondingly small size can be used.

To reduce the effects of pressure fluctuations in the area between the valve seats of a closed-end pressure regulator, a flow guide element in that area and an additional, external damping element are usually provided. The flow guide element deflects the hydraulic fluid flowing between the two poppet valves in some sections away from the direct flow path, in order to avoid Venturi effects between the poppet valves and the connection to the consumer, but this defined flow guiding increases the hydraulic resistance to an undesired extent and has an adverse effect on the valve dynamics.

To dampen the pressure fluctuations, the damping element comprises a piston element that can be displaced as a function of the pressure present at the time in the last-mentioned area of a closed-end pressure regulator. The piston element has an inherently stable structure under pressure and moves longitudinally in a cylinder housing against a spring device, so that pressure peaks in the closed-end pressure regulator are automatically reduced as a function of the piston element's position, which varies according to the pressure.

In addition or alternatively to this, the piston element of the damping device can be made elastically deformable as a function of pressure so that it is deformed to a greater or lesser extent as a function of the pressure prevailing in the closed-end pressure regulator, in such manner that pressure peaks in the closed-end pressure regulator are in each case reduced to the desired extent by a pressure-dependent deformation and/or as a function of the pressure-dependently varying position of the piston element.

However, closed-end pressure regulators made with damping elements are disadvantageously characterized by high design complexity so that, compared with pressure regulators made without a damping element, their production costs increase to an undesired extent.

In the design of the closed-end pressure regulators described above, the requirements for good control dynamics at the same time as low leakage constitute conflicting demands which can only be resolved by the acceptance of compromises. The geometrical design of the first poppet valve made as a ball-seat valve determines the maximum leakage or the maximum volume flow that can be passed through the closed-end pressure regulator if the second poppet valve, which is often made as a cone-seat or flat-seat valve, is made with essentially larger dimensions. The valve body of the first poppet valve, preferably formed as a ball, is actuated by a push-rod or valve tappet, which after the opening of the first poppet valve, clears the open cross-section of the inlet geometry of the closed-end pressure regulator regardless of the slide's position between the throttle or diaphragm of the first poppet valve and the push-rod.

At low oil temperatures, because of the higher viscosity of the hydraulic fluid, the above-described closed-end pressure regulators have a greatly reduced inlet volume flow, which adversely affects the valve dynamics in particular of pilot-pressure-controlled clutch valves. However, compensation of this temperature-dependent valve dynamics impairment by a larger inlet geometry of the closed-end pressure regulator is not, or is only partially expedient since then, at high hydraulic fluid temperatures, the closed-end pressure regulators have an undesirably large leakage volume flow.

SUMMARY OF THE INVENTION

Accordingly, the purpose of the present invention is to provide a pressure control valve device characterized by good valve dynamics at the same time as low leakage, and which is simply designed.

The pressure control valve device according to the invention is made with at least one inlet area and a first outlet area and at least one second outlet area, which can be connected to one another by two poppet valves. Upstream from the second poppet valve, positioned between the first outlet area and the second outlet area, is a flow guide device with an inflow area and an outflow area a distance away therefrom in the axial extension of the flow guide device, for the defined guiding of the flow of fluid flowing from the inlet area toward the second poppet valve.

According to the invention, the flow guide device is provided with a plurality of channel areas separate from one another, in such manner that helical motion is imparted to the fluid flowing through the channel areas of the flow guide device in the direction of the second poppet valve downstream from the outflow area. Advantageously, the channel areas can impart to the fluid flowing toward the second poppet valve an at least approximately vortex-shaped flow pattern downstream from the outflow area.

Thus, compared with pressure control values known from the prior art, the fluid flow between the two poppet valves is given a spiral motion by virtue of which its flow behavior is more stable. This results from the fact that in the area of the curvatures and deflections imposed by the channel areas, a substantial part of the flow energy is additionally converted to vortex energy. Accordingly, compared with conventionally designed pressure control valve devices, the fluid particles of the fluid flowing in the principal flow direction, i.e. toward the second poppet valve, undergo a gyroscopic movement whereby the flow behavior is more free from reaction effects and the damping is therefore greater than in conventional pressure control valve devices.

Furthermore, excitations and disturbances due to pressure fluctuations in the inlet area and in the first outlet area are reduced due to the induced spiral flow and during passage through the flow guide owing to a decrease of interference energy, such that a tangential incidence angle of the stream lines of the flowing hydraulic fluid in the area of the second poppet valve results in a more indirect pressure propagation in the flow direction, and thus in stabilizing behavior.

In addition, compared with conventional valve devices, in the pressure control device according to the invention, fluctuation excitations, for example by a proportional magnet that actuates the poppet valves, are more effectively damped as a result of the gyroscopic movement of the fluid particles of the fluid in the flow direction, and interferences between the input signal and the output signal are more effectively suppressed and the venting behavior of the pressure control valve device when it contains trapped air is improved.

Basically, the advantage of the vortex-shaped flow of the hydraulic fluid volume flow passing through the pressure control valve device, i.e. the twisting motion imparted to the hydraulic fluid, is that the fluid moves with low flow resistance in the direction of the second poppet valve and, in the area of the second poppet valve, impinges tangentially on the sealing surface of a valve closure element of the second poppet valve and on the second valve seat. Due to this, the pressure control valve device can operate with short response times and good valve dynamics. Moreover the temperature-dependent reduction of the incoming volume flow also has smaller effects on the valve dynamics than in the valve devices known from the prior art, so that the inlet geometry of the pressure control valve device can be designed in accordance with a necessary minimum and also temperature-dependent leakage volume flow is limited in a simple manner.

Furthermore, by virtue of the spiral flow imparted to the hydraulic fluid in the area of the flow guide device, deviations from symmetrical flow of the hydraulic fluid in the pressure control valve device are reduced and fluidic transverse forces acting upon the valve closure element and a valve tappet that actuates the closure element are reduced in a simply designed and inexpensive manner, such forces influencing the function of the pressure control valve device increasingly disadvantageously as their values become greater. This impairment of the function of the pressure control valve device results from frictional forces caused by the transverse forces, which occur in the area of the bearings of the valve tappet and increase the hysteresis of the pressure control valve device.

Compared with conventional valve devices, the pressure control valve device according to the invention is also characterized at low operating temperatures by short transient response times. In a stability comparison, the pressure control valve device is characterized by more pronounced damping and consequently more rapid decay behavior in a departure from normal, so the pressure control valve device can even be operated without a separate damping device that would increase production costs and seat-bounce in the area of the second poppet valve.

The guiding frequency steps in the area of load transfer are characterized by a sharper cutoff, and this is independent of temperature. In addition, with the pressure control valve device according to the invention, despite the omission of a damper, the suppression of disturbances during load transfer tends to be better. Compared with conventional valve devices, within the flow guide device and in the area of the second poppet valve the pressure control valve device is characterized by a smaller number of dead zones and by reduced eddy formation.

It is expedient for the channel areas to be formed at least approximately helically as in a screw. For this, the channel areas can be curved in the same direction along the flow direction of the fluid, or they can even be directed straight, as a function of the orientation of the channel areas relative to the longitudinal axis of the flow guide device and the length of the channel areas, as a first approximation to a screw.

In an advantageous further development of the pressure control valve device according to the invention, the fluid is guided through the channel areas in substantially laminar flow, whereby compared with known pressure regulation valves, in which the hydraulic fluid often forms undesired eddies and back-flows which increase the through-flow resistance, the through-flow resistance of the pressure control valve device according to the invention is minimized.

In an advantageous further development the through-flow resistance of the pressure control valve device is reduced if the channel areas are separated from one another by partitions whose thickness tapers continuously from the inflow area to the outflow area, and in further advantageous embodiments of the pressure control valve according to the invention the end faces of the partitions in the inflow area are rounded in order to reduce or avoid the eddying of the hydraulic fluid in the inflow area of the flow guide device, which increases the through-flow resistance.

A further advantageous embodiment of the pressure control valve device according to the invention is made with a nozzle area between the outflow area of the flow guide device and the second poppet valve, by means of which the vortex-like flow of the hydraulic fluid can be directed in the form of a thin-film flow in the area of the outer surface of the nozzle selectively in the direction of the valve seat of the second poppet valve, and in a further development of the pressure control valve device, starting from the outflow area the nozzle area tapers conically toward the second valve seat and the flow lines that move along the walls are guided as harmoniously as possible from the outflow area of the flow guide device toward the valve seat of the second poppet valve and helical impingement as free from losses as possible can be achieved.

In other advantageous embodiments of the pressure control valve device according to the invention, sufficient damping of pressure fluctuations at the same time as low through-flow resistance is achieved if the diametrically tapering section of the nozzle area is followed by an at least approximately hollow-cylindrical transition zone, followed in turn by an optional diffuser which merges into the second valve seat, since the hydraulic fluid flow lines guided along the walls in the nozzle area can undergo further, smooth deflections without influencing the twisting or vortex-like flow, and pressure fluctuations can thus be damped further without appreciably increasing the through-flow resistance.

In an embodiment of the pressure control valve device that can be produced inexpensively and is technologically simple to make, the nozzle area and the part of the flow guide device comprising the channel areas are made from different materials, and in a further embodiment of the pressure control valve device which is simple to assemble, the nozzle section and the part of the flow guide device with the channels can preferably be joined to one another by a clip connection.

In an advantageous further development of the pressure control valve device according to the invention, the fluid flows through the valve seat of the second poppet valve at least approximately in the tangential plane of an area of a sealing surface of a valve closure element that co-operates with the second valve seat, whereby the risk of seat-bounce in the area of the second poppet valve is reduced considerably and both an outflow with lower losses in the area of the valve seat, and good dynamics of the pressure control valve device are achieved, especially at low operating temperatures of the hydraulic fluid.

An embodiment of the pressure control valve device which ensures its correct function in a simply designed manner is characterized in that a valve tappet in active connection with the valve closure element is guided to move longitudinally in the area of the part of the flow guide device comprising the channel areas, since in this way transverse forces acting on the valve tappet can in a simple manner be supported in that area by a plurality of support points separated from one another and the tilting and oblique positioning of the valve tappet, which impair its mobility, are avoided.

In a further advantageous design of the pressure control valve device according to the invention, the first poppet valve is made with a ball seat and a diaphragm forming the valve seat has a thickness smaller that 0.4 mm and preferably smaller than 0.3 mm, whereby, compared with conventionally made pressure control valve devices, the spread of the volume flow over the temperature range is reduced and the temperature dependence of the valve characteristic is decreased.

If the second poppet valve is made with a conical seat, then for the same control pressure, compared with a ball seat or a flat seat the valve closure element that co-operates with the valve seat has a larger opening stroke, so that compared with a ball seat or flat seat the helical effect of the hydraulic fluid flow that improves the valve dynamics is further enhanced. In addition, in the case of a poppet valve made with a conical seat the flow of the hydraulic fluid can take place tangentially to the seat surface of the second poppet valve with lower through-flow resistance.

Essentially, however, the above-described advantages of the pressure control valve device according to the invention can also be achieved if the second poppet valve is made with a ball seat or a flat seat.

BRIEF DESCRIPTION OF THE DRAWINGS

Further advantages and advantageous further developments of the invention emerge from the example embodiments whose principle is described with reference to the drawing, in which, for the sake of clarity when the example embodiments are described, the same indexes are used for structurally and functionally equivalent components.

The drawing shows.

DETAILED DESCRIPTION OF THE PREFERRED EMBODIMENTS

Figure 1:
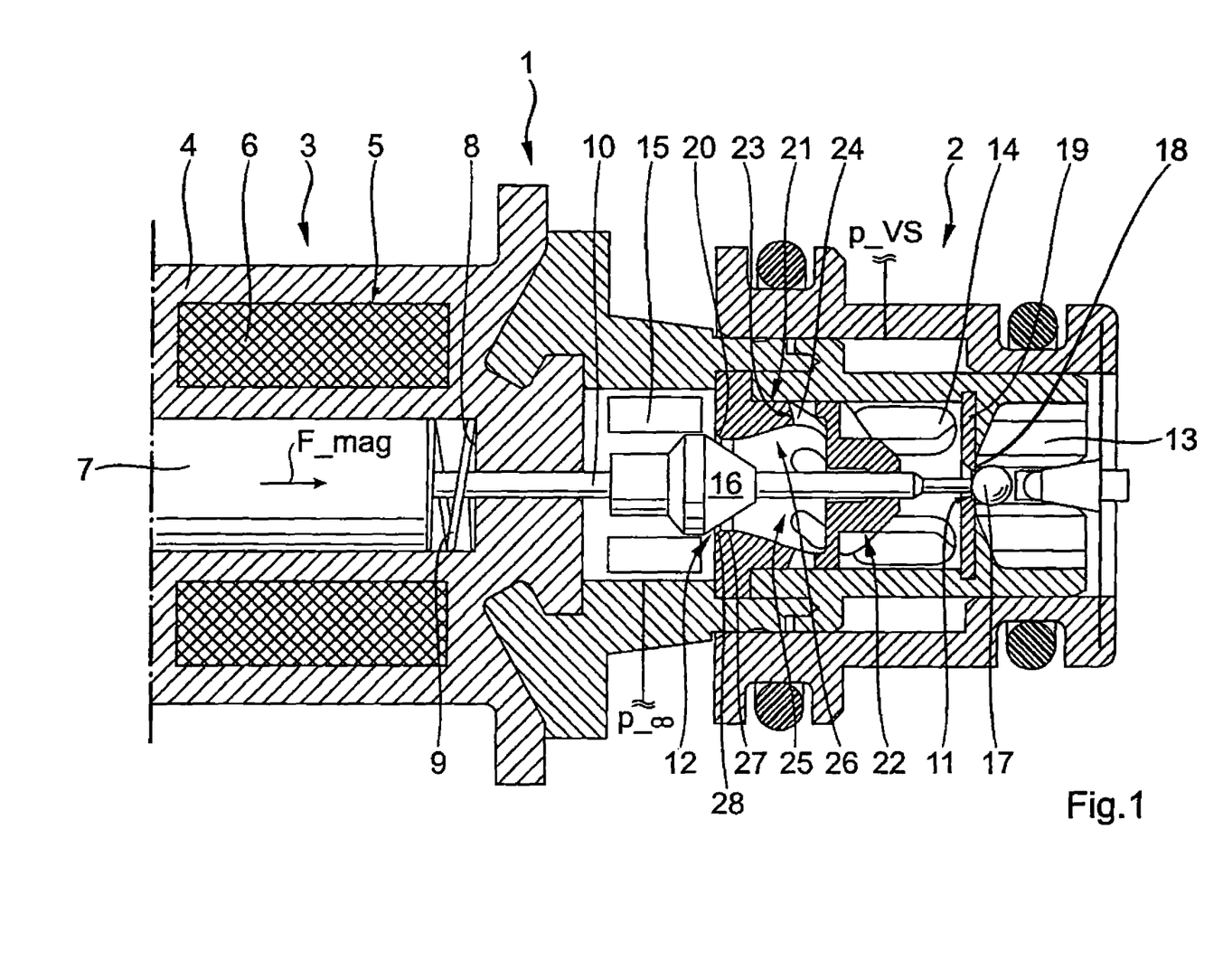
FIG. 1: Schematic longitudinally sectioned view of a pressure control valve device.

FIG. 1 shows schematically a longitudinally sectioned view of a pressure control valve device 1 of a hydraulic system for producing a required operating condition of a motor vehicle automatic transmission, which comprises a valve device 2 and an actor device 3 which actuates the valve device 2 in the manner described later. The pressure control valve device 1 represented in the drawing is designed as a pressure-limiting valve which can be actuated as a function of a pilot control pressure adjusted by another pressure control valve of the hydraulic system, and by means of which an actuating pressure can be produced for a shifting element such as a disk clutch or disk brake.

The actor device 3 of the pressure control valve device 1 comprises in a housing 4 a proportional magnet 5 whose coil 6, in the energized condition, acts upon an armature 7 with a magnetic force F_mag and displaces it from the position shown in FIG. 1, against the spring force of a spring device 9, in the direction of a stop 8.

The armature 7 is in active connection with a valve tappet 10, so that the armature 7 and the valve tappet 10 are actuated together by the proportional magnet 5. Depending on the position, at the time, of the valve tappet 10 guided in longitudinal displacement in components of the pressure control valve device 1 fixed to the housing thereof, a first poppet valve 11 and a second poppet valve 12 are opened or closed.

In the present case the first poppet valve 11 is designed as a ball seat valve and the second poppet valve 12 as a conical seat valve, such that the first poppet valve 11, when closed, cuts off an inlet area 13, which constitutes the pressure supply area of the pressure control valve device 1, from a first outlet area 14, and when open, enables the first outlet area 14 to be supplied with hydraulic fluid from the inlet area 13.

The second poppet valve 12 can cut off a connection between the first outlet area and a second outlet area, to produce a pressure p_VS in the first outlet area 14. In this case the second outlet area 15 is connected to an area, at ambient pressure p_∞, of a transmission device designed as an automatic transmission, so that the pressure p_VS in the first outlet area 14 is reduced when the second poppet valve 12 is open, as a function of how far it is open.

Both the valve closure element 16 of the second poppet valve 12, in this case made with a conical sealing surface, and also the ball-shaped valve closure element 17 of the first poppet valve 11, are actuated by the valve tappet 10 arranged to move in the axial direction of the valve device 2 and the armature 7, whereby, in the position of the armature 7 shown in FIG. 1, the valve closure element 17 of the first poppet valve 11 is fully in contact against the first valve seat 18, which in the area of the diaphragm 19 is formed with a diaphragm thickness of 0.4 mm or less and in particular 0.3 mm or less, so that the first poppet valve 11 is closed.

In this operating condition of the pressure control valve device 1 the second poppet valve 12, or rather the valve closure element 16 of the second poppet valve 12, is lifted clear by its maximum stroke path from the second valve seat 20, so that the first outlet area 14 is unpressurized and the pressure p_VS in the first outlet area 14 corresponds to the ambient pressure p_∞.

Upstream from the second poppet valve 12 arranged between the first outlet area 14 and the second outlet area 15, is provided a flow guide device 21 having an inflow area 22 and an outflow area 23, for defined guidance of the flow of fluid flowing from the inlet area 13 and/or the first outlet area 14 in the direction of the second poppet valve 12.

In the flow guide device 21 the fluid passes between the inflow area 22 and the outflow area 23 through a plurality of channel areas 24 that are distributed around the periphery of the flow guide device 21 and separated from one another and which are shaped at least approximately helically so that an at least approximately vortex-shaped or twisting flow path is imparted to the fluid flowing toward the second poppet valve 12 downstream from the outflow area 23. The fluid passes through the channel areas 24 in a substantially laminar flow mode, so that its passage through the valve device 2 in this area is characterized by the lowest possible flow losses.

Between the outflow area 23 of the flow guide device 21 and the second poppet valve 12 is provided a nozzle section 25 which, starting from the outflow area, tapers conically toward the second poppet valve 12 and through which, after emerging from the outflow area 23 of the flow guide device 21, the fluid flows with vortex movement. During this the fluid flows through the nozzle section 25, in the area of an inner surface of the nozzle that delimits the inside space 26 of the nozzle area, in a thin-film flow mode. Connected after the area of the nozzle section 25 whose diameter tapers, is an at least approximately hollow-cylindrical transition zone 27, which in turn is positioned between the part of the nozzle section 25 with the tapering diameter and a diffuser area 28 which merges into the second valve seat 20.

The effect of the above-described design of the flow guide device 21 in combination with the nozzle section 25 and the subsequent transition zone 27 and diffuser area 28, is that when the second poppet valve 12 is open, the twisting or vortex-shaped flow of fluid encounters the second valve seat 20 tangentially to the conical surface of the valve closure element 16 of the second poppet valve 12 and flows past the sealing surface of the valve seat 20 with low flow losses.

By virtue of the above-described forced flow, pressure fluctuations in the inlet area 13 are reduced and oscillations resulting from the pressure fluctuations are damped, since in the area of the flow guide device 21 the interference energy is absorbed to a greater extent because of the imposed spiraling than it is in conventionally designed valve devices or clutch valves.

Figure 2:
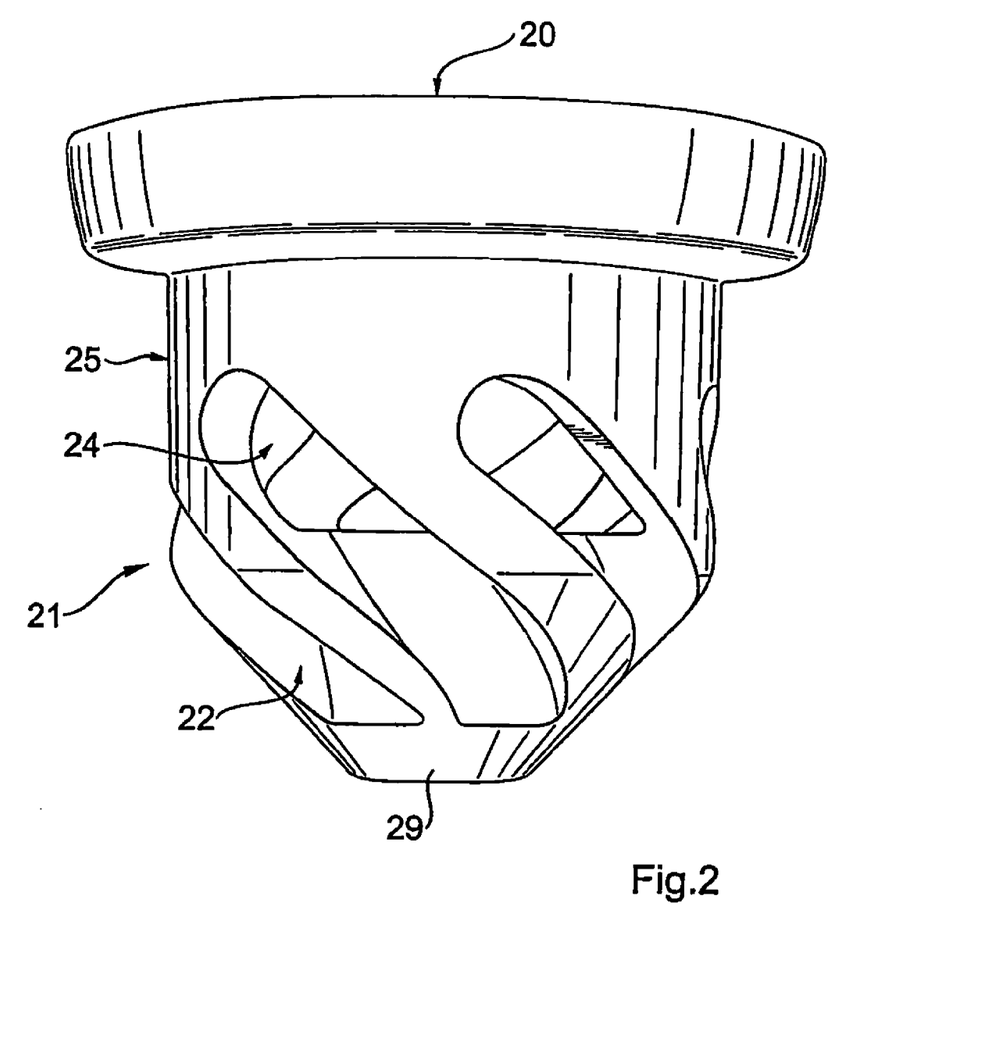
FIG. 2: Detailed view of a first embodiment of a flow guide device of the pressure control valve device in FIG. 1.

FIG. 2 shows a first example embodiment of the flow guide device 21, in which the part of the flow guide device 21 that comprises the channel areas 24 is formed integrally with the nozzle section 25 and the valve seat 20 of the second poppet valve 12. Thus, the first part of the flow guide device 21 has milled helical grooves which, from the tip 29 of the flow guide device 21, run in the axial direction of the flow guide device from an inner area outward, pass through the wall of the flow guide device, and form a communication between the surroundings of the flow guide device 21 and the inside space 26 of the nozzle. By virtue of this design of the channel areas 24, the desired twist or vortex-shaped flow is imparted to the fluid flowing through the flow guide device 21.

Thanks to the helical flow, deviations from symmetrical fluid flow are reduced and transverse forces acting on the valve closure element 16 of the second poppet valve 12 and on the valve tappet 10, which influence the function of the pressure control valve device disadvantageously, are diminished. The disadvantages result from friction forces that occur in the area of the slide bearings of the valve tappet 10 and in the area between the conical sealing surface of the valve closure element 16 of the second poppet valve 12 and the valve seat 20 during a closing or opening process of the second poppet valve 12, since the forces contribute toward increasing the hysteresis of the pressure control valve device 1.

In addition, with this pressure control valve device 1, thanks to the helical flow produced in the area of the flow guide device 21 any oscillation excitation of the valve tappet 10 decays more rapidly compared with pressure control valves known from the prior art, each formed with a damping element, even in the absence of any such damping element. Thus, the pressure p_VS produced by the pressure control device in the first outlet area 14 is made available earlier for actuating a clutch valve acted upon by the pressure p_VS and therefore for actuating a shifting element of an automatic transmission device. Moreover, the pressure fluctuations induced by the excitation of valve tappet oscillations are produced to a lesser extent and for a shorter time, and are therefore introduced into the system also for a shorter time.

Thanks to the improved fluctuation stability of the pressure control valve device 1, so-termed seat-bounce in the area of the second poppet valve 12 is also avoided or substantially reduced, whereby compared with known clutch valves the life of the pressure control valve device 1 is extended. In conventional clutch valves or valve devices seat-bounce occurs, particularly if the valve closure element of a poppet valve has a short opening stroke, when excitations or oscillations of the valve closure element and the valve tappet in active connection with it, whose amplitude is in the range of the opening strokes, result in brief, undamped and therefore undesired contact of the valve closure element against the valve seat, so that in such operating conditions of a pressure control valve high loads occur in the area of a poppet valve, which in the long term have an adverse effect on the function of a clutch valve and therefore that of an automatic transmission.

Figure 3:
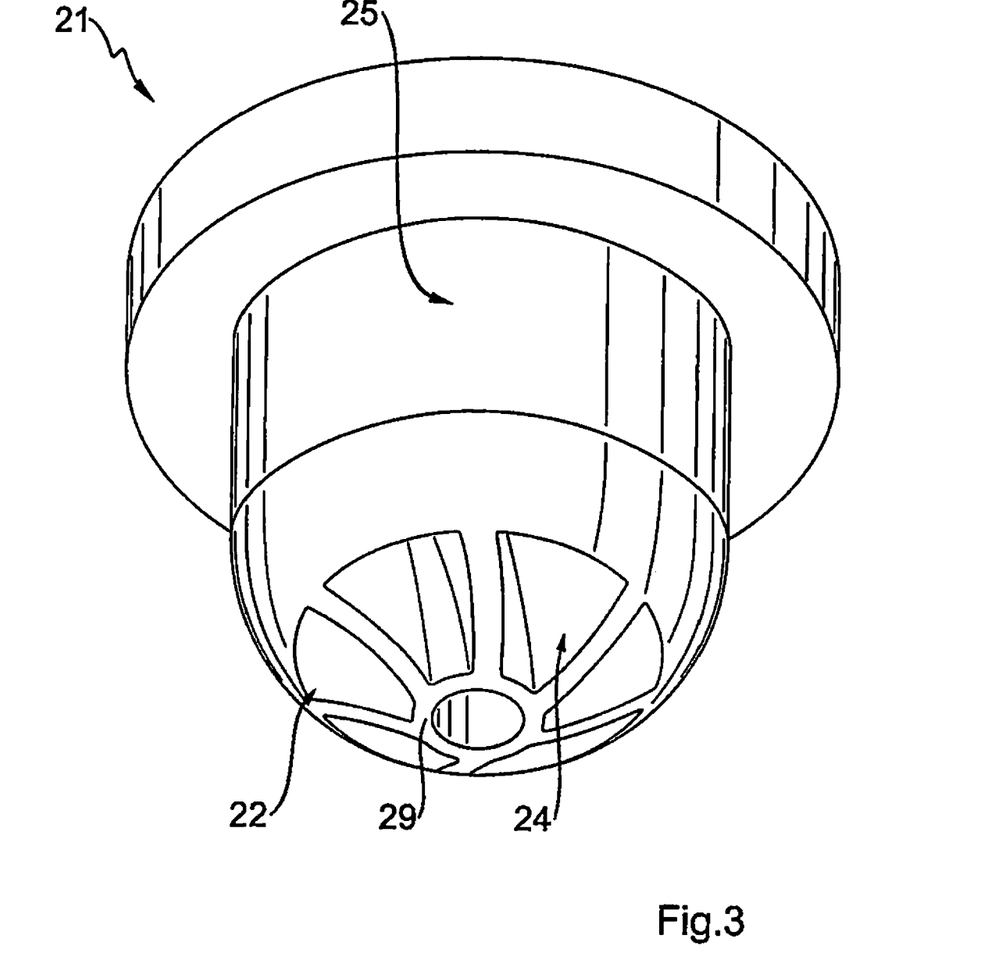
FIG. 3: Detailed view of a second embodiment of a flow guide device of the pressure control valve device in FIG. 1.
Figure 4:
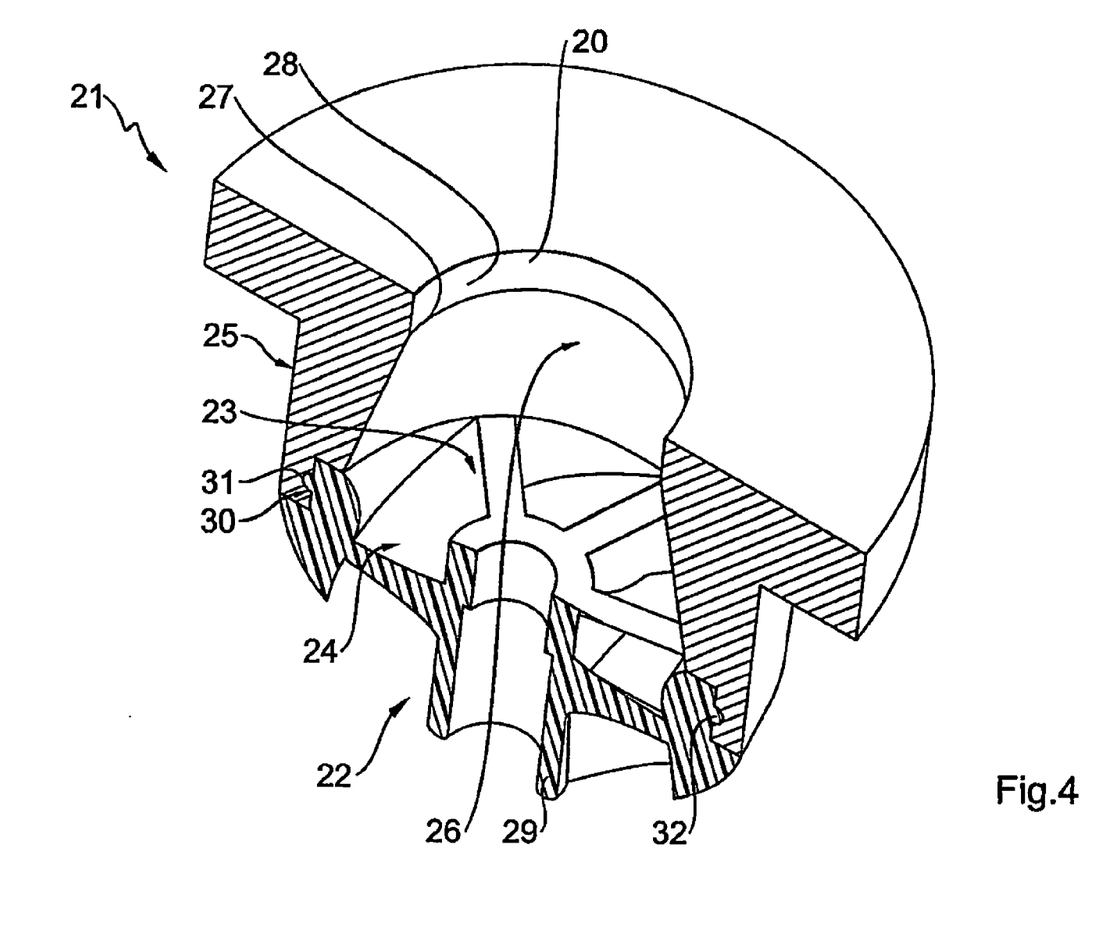
FIG. 4: Three-dimensional sectioned view of the flow guide device in FIG. 3.

FIGS. 3 and 4 show a second example embodiment of the flow guide device 21, in which parts of the flow guide device 21 comprising the nozzle section 25 and the channel areas 24 are made from different materials and are joined to one another by a clip connection 30. During assembly the nozzle section 25 is pushed over the part of the flow guide device 21 having the channel areas 24 and engages with an annular ring groove 31 in an annular bead 32. The nozzle section 25 in this case formed together with the second valve seat 20 is made from metal, preferably brass, while the part of the flow guide device 21 with the channel areas 24 is made from plastic.

Figure 6:
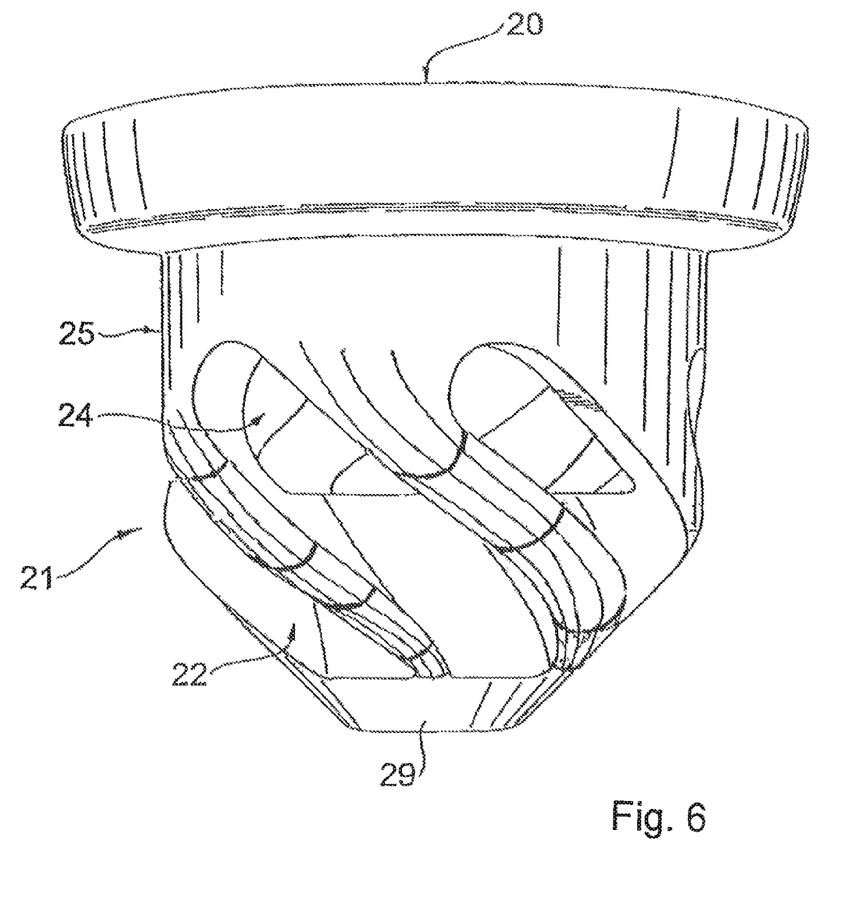
FIG. 6: Detailed view of a first further embodiment of a flow guide device of the pressure control valve device in FIG. 1.
Figure 7:
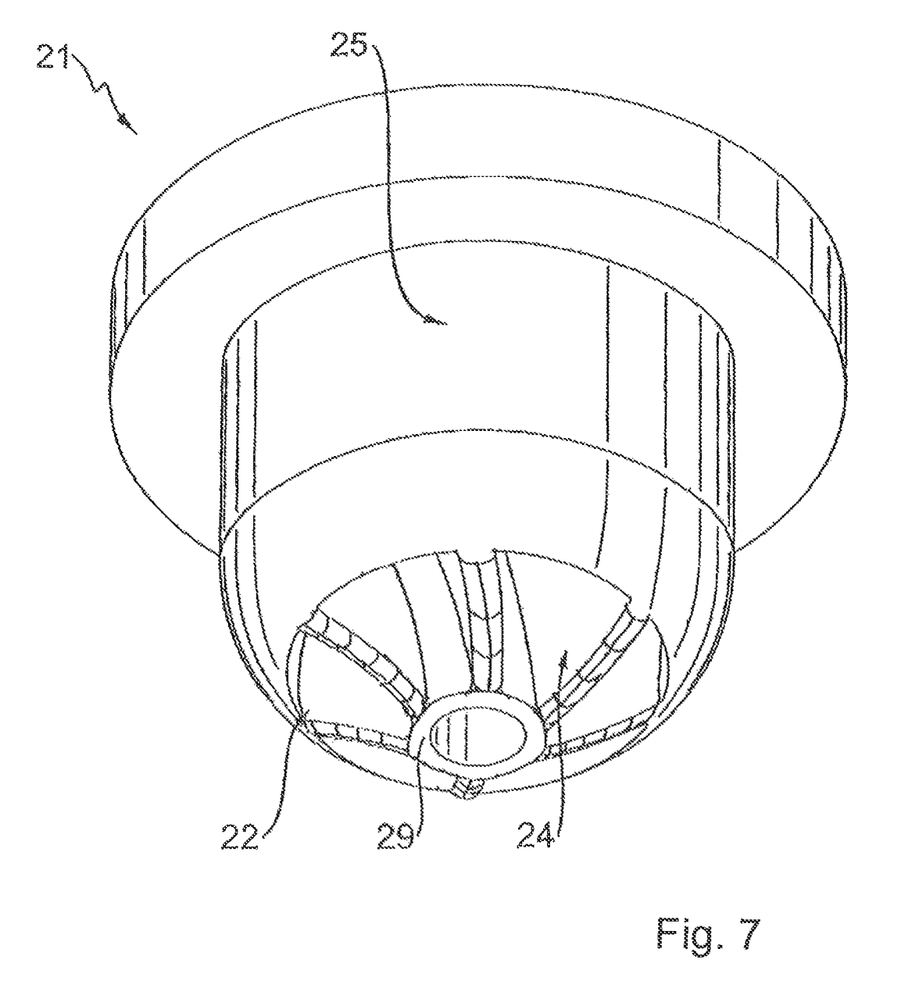
FIG. 7: Detailed view of a second further embodiment of a flow guide of the pressure control valve device in FIG. 1.

The second embodiment of the flow guide device 21 shown in FIGS. 3 and 4 can be made more inexpensively compared with the first embodiment shown in FIG. 2, and by making the nozzle section 25 from metal a long life of the pressure control valve device 1 is achieved. As shown in FIG. 6 and 7, the end faces of the partitions in the inflow area are rounded in order to reduce or avoid the eddying of the hydraulic fluid in the inflow area of the flow guide device, which increases the through-flow resistance.

Besides the measures described earlier, the helical or vortex-shaped flow of the fluid in the area of the second valve seat 20 of the second poppet valve 12 can also be varied as a function of the axial length of the conical sealing surface of the valve closure element 16 of the second poppet valve 12.

Thus, with a longer design of the conical sealing surface of the valve closure element 16, which presents a larger impingement area for the hydraulic fluid volume flowing helically, the flow through the second poppet valve is improved still further and the pressure control valve device is characterized by more rapid response behavior.

Figure 5:
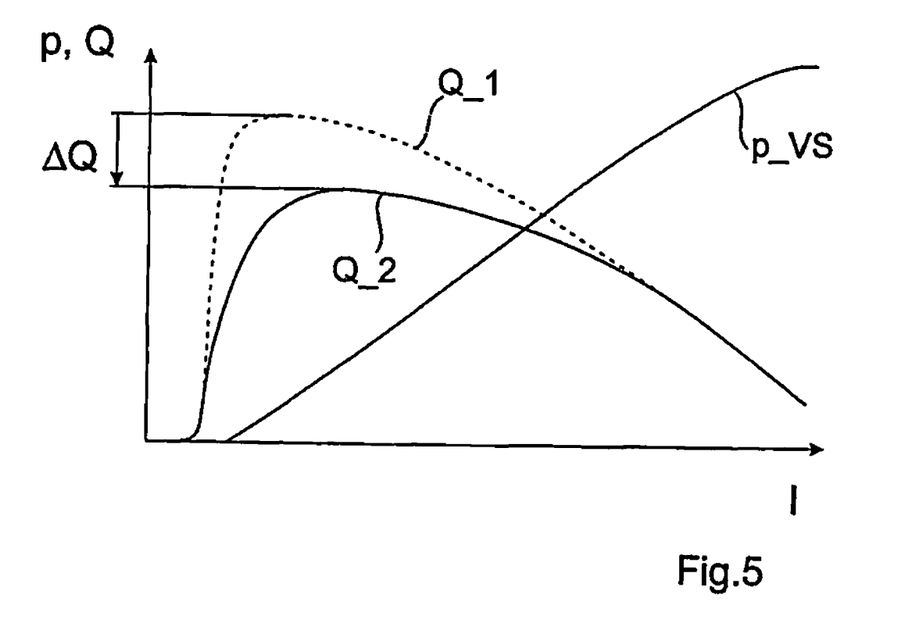
FIG. 5: Graphical comparison between the through-flow quantity in a conventional clutch valve and in the pressure control device according to FIG. 1, plotted against the control current through the actor device of the clutch valve or the pressure control valve device.

FIG. 5 illustrates in the form of a graph the relationship between a volume flow Q_1 that can be passed through a conventional pressure control valve and a control current I in an actor device that actuates the clutch valve. This variation is compared against another variation which represents graphically the relationship between a volume flow Q_2 that can be passed through the pressure control valve device 1 according to FIG. 1 and a control current I in the actor device 3 that actuates the valve device 2. The variation of the volume flow Q_1 that can be passed through the clutch valve known from the prior art is plotted as a broken line, while the variation of the volume flow Q_2 passing through the pressure control valve device 2 is shown as a continuous line.

In addition, the relationship between the pressure p_VS in the area of the first outlet area 14, as a function of the control current I, and the respective volume flows Q_1 and Q_2 passing through the known pressure control valve device, are shown. The temperature at which the volume flow Q_1 or Q_2 and the pressure p_VS were determined is 45° C.

From the graphical comparison of the volume flow variations Q_1 and Q_2 it can be seen that the volume flow Q_2 passing through the pressure control valve device 1 is smaller than the volume flow Q_1 which, for the same control current I, has to be passed in order to produce the same pressure value p_VS in the first outlet area 14 in each case. ΔQ denotes and shows the difference between the maxima of the volume flows Q_1 and Q_2.

A hydraulic pump that provides the supply pressure in the inlet area 13 can be operated, in combination with the pressure control valve device 1, with lower delivery power than with conventional clutch valves, so that all-in-all a smaller, cheaper hydraulic pump which occupies less structural space is needed. In addition, compared with a known pressure control valve the leakage volume flow of the pressure control valve device 1 is lower on account of the reduced volume flow delivered by the hydraulic pump.

Furthermore, at the reference temperature of 45° C. and with a reduced through-flow quantity, the pressure control valve device 1 shows the same response behavior as a pressure control valve known from the prior art. In lower temperature ranges the pressure control valve device 1 even shows substantially better response behavior than a conventional valve device, and in particular at temperatures of −10° C. or −20° C. considerable improvements of the response behavior of the pressure control valve device 1 are observed.

Basically, using the pressure control valve device according to the invention, besides the above-described adjustment of actuating pressures for shifting elements of automatic transmissions, hydraulic working pressures for other hydraulic consumers can be produced with little design complexity, good dynamics and high precision.

Indexes
1 Pressure control device
2 Valve device
3 Actor device
4 Housing
5 Proportional magnet
6 Coil
7 Armature
8 Abutment
9 Spring device
10 Valve tappet
11 First poppet valve
12 Second poppet valve
13 Inlet area
14 First outlet area
15 Second outlet area
16 Valve closure element of the first poppet valve
17 Valve closure element of the second poppet valve
18 Valve seat of the first poppet valve
19 Diaphragm
20 Valve seat of the second poppet valve
21 Flow guide device
22 Inflow area
23 Outflow area
24 Channel area
25 Nozzle section
26 Inside space of the nozzle
27 Transition zone
28 Diffuser zone
29 Tip of the flow guide device
30 Clip connection
31 Ring groove
32 Bead
F_mag Magnetic force
I Control current
p_VS Pressure in the first outlet area
p_∞ Pressure in the second outlet area
Q Volume flow

The invention claimed is:

1. A pressure control valve device (1) with at least one inlet area (13) for supplying a pressurized fluid to both a first outlet area (14) and at least one second outlet area (15), and the inlet area (13), the first outlet area (14) and the second outlet area (15) being selectively, simultaneously and sustainabley fluidly connectable to one another by first and second poppet valves (11, 12);

a flow guide device (21), with an inflow area (22) and an outflow area (23) and an inner surface that defines an inside space, is provided upstream of the second poppet valve (12) and arranged between the first outlet area (14) and the second outlet area (15) and spaced from the second poppet valve (12) for guiding the fluid flowing from the inlet area (13) toward and past the second poppet valve (12) and into the at least one second outlet area (15) in a defined manner when the second poppet valve (12) is open, the inner surface tapers from the outflow area to a valve seat of the second poppet valve, the flow guide device (21) being provided with a plurality of separate channel areas (24), separated from one another by partitions, such that downstream of the outflow area (23), a helical flow movement is imparted to the fluid flowing toward the second poppet valve (12) by the channel areas (24) of the flow guide device (21), and the channel areas (24) initiating the helical flow movement to the fluid prior to the fluid being discharged from the flow guide device (21) through the second poppet valve (12) and into the at least one second outlet area (15) when the second poppet valve (12) is open.

2. The pressure control valve device according to claim 1, wherein the channel areas (24) impart to the fluid flowing toward the second poppet valve (12), downstream of the outflow area (23), the helical flow movement that is at least approximately in a form of a vortex.

3. The pressure control valve device according to claim 1, wherein the channel areas (24) are helical.

4. The pressure control valve device according to claim 1, wherein the fluid flows through the channel areas (24) in a substantially laminar flow.

5. The pressure control valve device according to claim 1, wherein the fluid flows through the valve seat (20) of the second poppet valve (12) at least approximately in a tangential plane of an area of a sealing surface of a valve closure element (16) that cooperates with the valve seat (20) of the second poppet valve (12).

6. The pressure control valve device according to claim 5, wherein a valve tappet (10), that is in active connection with the valve closure element (16), is guided to move longitudinally in an area of the flow guide device (21) which comprises the channel areas (24).

7. The pressure control valve device according to claim 1, wherein the first poppet valve (11) has a ball seat and is made with a diaphragm (19) that forms the ball seat (18) and has a diaphragm thickness of ≤0.3 mm.

8. The pressure control valve device according to claim 1, wherein the valve seat of the second poppet valve (12) is a conical seat.

9. The pressure control valve device according to claim 1, wherein the valve seat of the second poppet valve (12) is a ball seat.

10. The pressure control valve device according to claim 1, wherein the valve seat of the second poppet valve (12) is a flat seat.

11. A pressure control valve device (1) with at least one inlet area (13) for supplying a pressurized fluid to both a first outlet area (14) and at least one second outlet area (15), and the inlet area (13), the first outlet area (14) and the second outlet area (15) being selectively, simultaneously and sustainably fluidly connectable to one another by first and second poppet valves (11, 12);
   a flow guide device (21), with an inflow area (22) and an outflow area (23), is provided upstream of the second poppet valve (12) and arranged between the first outlet area (14) and the second outlet area (15) and spaced from the second poppet valve (12) for guiding the fluid flowing from the inlet area (13) toward and past the second poppet valve (12) and into the at least one second area (15) in a defined manner when the second poppet valve (12) is open,
   the flow guide device (21) being provided with a plurality of separate channel areas (24), separated from one another, such the downstream of the outflow area (23), a helical flow movement is imparted to the fluid flowing toward the second poppet valve (12) by the channel areas (24) of the flow guide device (21),
   the chaqnnel areas (24) initiated the helical flow movement to the fluid prior to the fluid being discharged from the flow guide device (21) through the second poppet valve (12) and into the at least one second outlet area (15) when the second poppet valve (12) is opened, and
   the channel areas (24) are separated from one another by partitions whose thickness narrows from the inflow area (22) to the outflow area (23).

12. The pressure control valve device according to claim 11, wherein end faces of the partitions, which communicate with the inflow area (22), are rounded.

13. The pressure control valve device according to claim 11, wherein a nozzle section (25) is provided between the outflow area (23), of the flow guide device (21), and the second poppet valve (12).

14. The pressure control valve device according to claim 13, wherein a portion of the nozzle section (25), starting from the outflow area (23), conically tapers down in the direction of the second poppet valve (12).

15. The pressure control valve device according to claim 14, wherein the portion of the nozzle section (25) that tapers is connected to an at least approximately hollow-cylindrical transition zone (27).

16. The pressure control valve device according to claim 15, wherein the hollow-cylindrical transition zone (27) of the nozzle section (25) is connected to a diffuser section (28) which merges into a valve seat (20) of the second poppet valve.

17. The pressure control valve device according to claim 13, wherein the nozzle section (25) and a part of the flow guide device (21), which comprises the channel areas (24), are made of different materials.

18. The pressure control valve device according to claim 13, wherein the nozzle section (25) and a part of the flow guide device (21), which comprises the channel areas (24), are joined to one another by a clip connection (30).

19. A pressure control valve device (1) with at least one inlet area (13) and a first outlet area (14) and at least one second outlet area (15),
   the at least one inlet area (13), the first outlet area (14), and the at least one second outlet area (15) being selectively in simultaneous and sustained fluid communication with one another by first and second poppet valves (11, 12), as a function of how far the second poppet valve is open, such that a flow guide device (21), with an inflow area (22) and an outflow area (23), is provided upstream of the second poppet valve (12) and arranged between the first outlet area (14) and the second outlet area (15) and spaced from the second poppet valve (12) for guiding fluid flowing from the inlet area (13), toward and past the second poppet valve (12) and into the at least one second outlet area (15) in a defined manner when the second poppet valve (12) is open,
   the flow guide device (21) being provided with a plurality of separate and distinct channel areas (24), each of the channel areas (24) being separated from one another by partitions whose thickness narrows from the inflow area (22) to the outflow area (23) such that, the channel areas (24) of the flow guide device (21) impart a helical flow movement to the fluid downstream of the outflow area (23), with the flow being toward and through the second poppet valve (12) and into the at least one second outlet area (15) when the second poppet valve (12) is open.

* * * * *